United States Patent [19]

Murto et al.

[11] 4,378,470

[45] Mar. 29, 1983

[54] INTERFACE CIRCUITS FOR CONNECTION TO NON-DEDICATED TELEPHONE LINES

[75] Inventors: Tapio H. Murto, Nepean; Stephen D. Alvey, Kanata, both of Canada

[73] Assignee: Northern Telecom Limited, Montreal, Canada

[21] Appl. No.: 247,229

[22] Filed: Mar. 25, 1981

[51] Int. Cl.³ .......................................... H04M 11/00
[52] U.S. Cl. ................................. 179/2 C; 179/2 DP
[58] Field of Search ..................... 179/1 C, 2 C, 2 DP, 179/2 A, 2 AM, 1 MN, 6.07, 6.11, 175.2 C

[56] References Cited

U.S. PATENT DOCUMENTS

| | | | |
|---|---|---|---|
| 3,376,389 | 4/1968 | Fair | 179/2 |
| 3,448,215 | 6/1969 | Engel | 179/1 MN |
| 3,551,597 | 12/1970 | Russell | 179/2 |
| 3,842,206 | 10/1974 | Barsellotti et al. | 179/2 A |
| 4,009,342 | 2/1977 | Fahrenschon et al. | 179/2 DP |
| 4,104,486 | 8/1978 | Martin et al. | 179/2 AM |
| 4,126,762 | 11/1978 | Martin et al. | 179/2 A |
| 4,321,429 | 3/1982 | Takatsuki et al. | 179/2 DP |

OTHER PUBLICATIONS

IBM Technical Disclosure Bulletin, vol. 17, No. 2, Jul. 1974, pp. 477–478, Chrisfield, R. P., Wrage, R. H. "Time Sharing Circuit for Voice and FSK Data".

Primary Examiner—G. Z. Rubinson
Assistant Examiner—W. J. Brady
Attorney, Agent, or Firm—R. John Haley

[57] ABSTRACT

Receive and transmit paths, for example for frequency shift keyed signals, are coupled to an interface circuit including a line transformer which is permanently connected to the telephone line via a high impedance. The effect of this high impedance on received signals is counteracted by an amplifier and/or a tuned circuit comprising a winding of the transformer. Switches in the interface circuit, responsive to received signals, serve to by-pass the high impedance, and reduce the gain of the amplifier and/or eliminate the effect of the tuned circuit, to permit normal coupling of signals between the telephone line and the receive and transmit paths.

14 Claims, 2 Drawing Figures

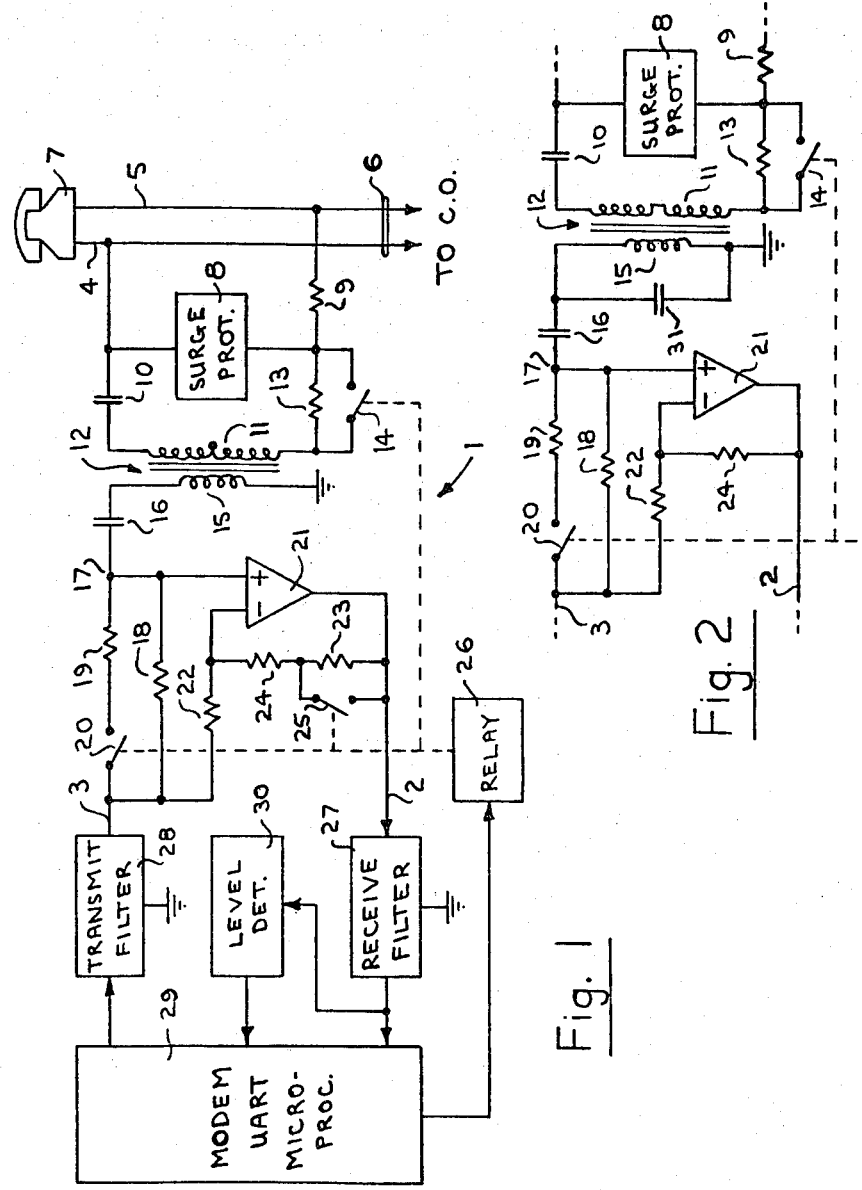

INTERFACE CIRCUITS FOR CONNECTION TO NON-DEDICATED TELEPHONE LINES

This invention relates to interface circuits for connection to non-dedicated telephone lines, and to apparatus including such interface circuits.

Telephone lines are increasingly being used for the transmission of signals other than ordinary telephony signals. In order to effect bidirectional transmission of such signals, it is known to couple a modem to a telephone line. In the case of a non-dedicated telephone line, i.e. a telephone line which is not used solely for transmission of the modem signals, it has been necessary to couple the modem to the telephone line for the transmission of the signals only when required, following a predetermined call-up procedure. Otherwise the connection of the modem would disturb telephony signals ordinarily transmitted via the telephone line.

It is desirable, however, to eliminate the predetermined call-up procedure and to provide a permanent coupling of the modem to the telephone line, without loading the telephone line to a sufficient extent that telephony signals are disturbed. It has been determined that a permanently coupled modem should present a relatively high impedance, for example at least 50 k$\Omega$, to the telephone line in order to avoid disturbing telephony signals. The use of such a high terminating impedance has resulted in an unacceptable signal loss in coupling signals between the modem and the telephone line.

In order to facilitate data collection, for example for remote metering purposes, via a non-dedicated telephone line it is known to connect a data transmitter to the telephone line, and to access the data transmitter by means of ringing signals supplied via the telephone line and initiated by a remote data collection center. Such arrangements include a muting circuit for preventing ringing of the subscriber's telephone when the data transmitter is accessed. Such arrangements generally involve at least one of the disadvantages that the muting circuit also mutes parts of ordinary ringing signals; the ringing signals and/or the subscriber's telephone must be modified; and the data transmitter may be accessed in response to erroneous ringing signals arising from ordinary telephone calls.

Accordingly, an object of this invention is to provide an interface circuit for connection to a non-dedicated telephone line, which can be permanently connected to the telephone line without disturbing the normal use of the telephone line for the transmission of telephony signals and without necessitating any modification of a subscriber's telephone connected to the telephone line or of ringing signals supplied thereto.

According to one aspect of this invention there is provided an interface circuit for connection to a non-dedicated telephone line, said circuit comprising: switching means having a first state and a second state; means for presenting a high impedance to the telephone line in the first state of the switching means, whereby normal use of the telephone line is undisturbed; means for coupling signals from a transmit path to the telephone line and from the telephone line to a receive path in the second state of the switching means; and means for counteracting the effect of said high impedance on signals received via the telephone line in the first state of the switching means, whereby said signals are coupled to the receive path.

Preferably the means for coupling signals comprises a transformer and the means for presenting a high impedance comprises a high impedance via which a winding of the transformer is coupled to the telephone line in the first state of the switching means, the high impedance being by-passed in the second state of the switching means.

The means for counteracting the effect of said high impedance can comprise a tuned circuit, conveniently comprising a capacitor and a winding of the transformer, for counteracting the effect of said high impedance on signals received via the telephone line in the first state of the switching means and having frequencies at about the resonance frequency of the tuned circuit, and/or can comprise means for increasing, in the first state of the switching means, the gain of an amplifier which couples signals from the telephone line to the receive path. The former arrangement is particularly applicable to the receipt of frequency shift signals from the telephone line, the tuned circuit resonance frequency being selected in dependence upon the frequencies of the received signals.

This invention also extends to an apparatus for connection to a non-dedicated telephone line, said apparatus comprising an interface circuit as recited above and signalling means connected to the receive and transmit paths of the interface circuit, the signalling means being responsive to a predetermined combination of signals supplied to the receive path via the telephone and the interface circuit with the switching means of the interface circuit in said first state to cause the switching means to adopt said second state.

According to another aspect the invention provides an interface circuit for coupling a receive path and a transmit path to a non-dedicated telephone line, said circuit comprising: a transformer having first and second windings; first impedance means for coupling the first winding of the transformer to the telephone line with a sufficiently high impedance that normal use of the telephone line is undisturbed; second impedance means coupled between the transmit path and the second winding of the transformer; amplifier means coupled between the second winding of the transformer and the receive path; and switching means selectively operable to decrease the impedances of the first and second impedance means and to decrease the gain of the amplifier means. The amplifier means is preferably a differential amplifier means having differential inputs coupled to the second winding of the transformer and to the transmit path and having an output coupled to the receive path.

According to a further aspect the invention provides an interface circuit for coupling a receive path and a transmit path to a non-dedicated telephone line, said circuit comprising: a transformer having first and second windings; first impedance means for coupling the first winding of the transformer to the telephone line with a sufficiently high impedance that normal use of the telephone line is undisturbed; second impedance means coupled between the transmit path and the second winding of the transformer; coupling means coupling the second winding of the transformer to the receive path; a capacitor connected to the second winding of the transformer and forming a tuned circuit therewith, whereby signals having frequencies at about the resonance frequency of the tuned circuit and coupled to the first winding of the transformer via the first impedance means are coupled via the coupling means to the receive path; and switching means selectively operable to decrease the impedances of the first and second impedance means.

Preferably the switching means is selectively operable to decrease the impedance of the first impedance means to substantially zero and to decrease the impedance of the second impedance means to substantially match the characteristic impedance of the telephone line.

The invention also extends to apparatus for receiving and transmitting signals via a non-dedicated telephone line, said apparatus comprising an interface circuit as recited above and means responsive to signals supplied via the telephone line to the receive path for controlling the switching means.

The invention will be further understood from the following description with reference to the accompanying drawing, in which:

FIG. 1 illustrates apparatus including an interface circuit according to an embodiment of the invention; and FIG. 2 illustrates an interface circuit according to another embodiment of the invention.

Referring to FIG. 1, there is shown therein an interface circuit 1 which serves to permanently couple a receive path 2 and a transmit path 3 to the tip wire 4 and the ring wire 5 of a telephone line 6 which connects a subscriber's telephone 7 to a central office (C.O., not illustrated).

The interface circuit 1 includes a surge protection device 8 which is connected in series with a current limiting resistor 9 across the line 6. Connected in series with one another and in parallel with the device 8 are a coupling capacitor 10, the balanced windings 11 of a line transformer 12, and a high impedance resistor 13. A normally open switch 14 is connected in parallel with the resistor 13. Another winding 15 of the line transformer 12 is connected via a coupling capacitor 16 to a junction point 17. The junction point 17 is connected via a high impedance resistor 18, and via a low impedance resistor 19 in series with a normally open switch 20, to the transmit path 3. A differential amplifier 21 has its non-inverting input connected to the junction point 17, its inverting input connected via a resistor 22 to the transmit path 3, and its output connected to the receive path 2. A feedback path from the output to the inverting input of the amplifier 21 includes series resistors 23 and 24. A normally open switch 25 is connected in parallel with the resistor 23. As shown by a broken line, the switches 14, 20, and 25 are constituted by contacts of a relay 26.

For example, various components in the interface circuit 1 may have the following values:
resistor 9: 20Ω;
capacitors 10 & 16: 2 μF;
resistors 13 & 23: 100 kΩ;
resistor 18: 200 kΩ;
resistor 19: 560Ω;
resistors 22 & 24: 12 kΩ.

It is assumed here that signals to be transmitted via the interface circuit 1 to and from the telephone line 6 are frequency shift keyed (FSK) signals, for example at frequencies of 1070 and 1270 Hz in the receive direction from the telephone line 6 to the receive path 2 and at frequencies of 2025 and 2225 Hz in the transmit direction from the transmit path 3 to the telephone line 6. Accordingly, the receive path 2 is coupled via a bandpass receive filter 27, having a passband including the receive frequencies, to a modem, and the modem is coupled via a low pass transmit filter 28, having a passband including the transmit frequencies, to the transmit path 3. The modem is coupled in known manner to a universal asynchronous receiver-transmitter (UART) and thence to a microprocessor. For simplicity the modem, UART, and microprocessor are shown as a single block 29 in FIG. 1. The output of the receive filter is also connected to a level detector 30 whose output enables the UART for receiving signals, and the relay 26 is controlled by the microprocessor, as described below.

In operation, the switch 14 is normally open so that a high impedance of about 100 kΩ is presented to the telephone line 6. As a result of this high impedance the interface circuit 1 can be permanently connected to the telephone line 6 without disturbing telephone signals thereon. This high impedance is substantially matched at the opposite side of the line transformer 12 by the high impedance of the resistor 18, the switch 20 also being open. As the switch 25 is open, the amplifier 21 provides a gain for received signals equal to the ratio of the feedback resistance of the resistors 23 and 24 to the resistance of the resistor 22. This gain is selected to substantially compensate for the signal loss suffered by received signals due to the high impedance resistor 13.

In order to establish communication via the telephone line 6, when it is idle, and the interface circuit 1, a remote signal source such as a data collection center is coupled to the telephone line 6 via the central office and supplies for example a constant mark (1270 Hz) which is conducted via the interface circuit 1 and the receive filter 27 to the level detector 30, which detects this signal and supplies an enabling signal to the UART. The remote signal source then supplies an FSK identity code to the telephone line 6, which code is similarly conducted via the interface circuit 1 and the receive filter 27 to the block 29, where it is compared by the microprocessor with a corresponding locally stored identity code. In the event that the compared codes are the same, the microprocessor controls the relay 26 to close the switches 14, 20, and 25 and triggers transmission of a ready signal, such as a constant mark (2225 Hz), from the block 29 via the transmit filter 28, the interface circuit 1, and the telephone line 6 to the remote signal source. Communication between the block 29 and the remote signal source can then take place, via the interface circuit 1 as described below, using FSK signalling in known manner. At the end of such communication, or in the event of an interruption of the communication due to the presence of telephony signals on the telephone line 1, the microprocessor in the block 29 controls the relay 26 to re-open the switches 14, 20, and 25, thereby returning the interface circuit to its original state.

The closure of the switches 14, 20, and 25 under the control of the relay 26 as described above results in the high impedance resistor 13 being bypassed by the switch 14, removing the signal losses associated therewith. At the same time the resistor 23 is bypassed by the switch 25, so that the gain of the amplifier 21 is reduced (e.g. to unity), the gain of this amplifier no longer being required because the signal losses are removed. Furthermore, the closing of the switch 20 reduces the impedance between the transmit path 3 and the junction point 17 to a value which substantially matches the characteristic impedance (e.g. 600Ω) of the telephone line 6 and which permits transmit signals to be supplied from the transmit path 3 to the telephone line 6.

FIG. 2 illustrates a modified form of interface circuit, the same references being used to denote the same components as in FIG. 1. The circuit shown in FIG. 2 differs from that of FIG. 1 only in that the switch 25 and the resistor 23 are dispensed with, so that only the resistor 24 appears in the feedback path of the amplifier 21 which consequently is a constant (e.g. unity) gain amplifier, and a capacitor 31 is connected in parallel with the winding 15 of the line transformer 12 to form a tuned circuit therewith. The capacitance of the capacitor 31 is selected to be such that the resonance frequency of the tuned circuit is similar to the frequencies of the FSK signals to be received. For example, the resonance frequency f of the tuned circuit is such that $f_2 = fm, fs$, where fm and fs are the frequencies of the mark and space receive signals respectively. Thus for $fm = 1270$ Hz and $fs = 1070$ Hz as described above, $f = 1166$ Hz. For example the capacitor may have a capacitance of about 0.01 $\mu F$ in order to provide such a resonance frequency.

The resonance of the tuned circuit at about the receive frequencies significantly reduces the signal loss for such signals when the switches 14 and 20 are open, thus counteracting the effect of the high impedance resistor 13 for the receive frequencies. The tuned circuit also acts as a bandpass filter when the switches are open, thereby serving to reduce interference signals. As the effect of the high impedance resistor 13 is counteracted by the tuned circuit, the additional gain for received signals provided by the amplifier 21 in conjunction with the open switch 25 and the resistor 23 in FIG. 1 is not required, so that the switch 25 and the resistor 23 are omitted with a consequent simplification of the circuit and the switching requirements. However, these components may also be provided as well as the tuned circuit, if additional gain is required for received signals when the switches 14 and 20 are open.

When the switches 14 and 20 in the circuit of FIG. 2 are closed, in the same manner as described above with reference to FIG. 1, the circuit of FIG. 2 operates in the same manner as that of FIG. 1. In this situation the reactance of the capacitor 31 is very much larger than the impedance presented by the resistor 19 which is connected via the switch 20, so that the tuned circuit has substantially no effect on the transmitted and received signals.

Whilst the interface circuit is not limited to any particular application, it is observed that it may particularly be used in a subscription television system for providing a connection between a subscriber's television unscrambling equipment and viewed-program memory and his telephone line, whereby viewed-program information stored in the memory may be read from time to time via the telephone line and new decoding information may be supplied to the unscrambling equipment via the telephone line, without disturbing the subscriber or his telephone service. As should be appreciated from the above description, the use of the interface circuit does not involve any subscriber action and does not result in ringing of the subscriber's telephone. Furthermore, the interface circuit does not require any modification of the subscriber's telephone or its operation, or of the ringing signals which are supplied thereto. The interface circuit may be used similarly for remote access to utility metering equipment, for office communications systems, and so on.

Although the interface circuit has been described in relation to the transmission and reception of FSK signals, it is of course not limited thereto and may be used for the reception and transmission of signals of arbitrary frequencies and in accordance with various signalling schemes. However, in the case of the interface circuit of FIG. 2 it is of course initially necessary to supply a signal at about the resonance frequency of the tuned circuit in order to effect the desired closing of the switches 14 and 20.

The invention is similarly not limited to the particular switching and coupling arrangements described, and numerous modifications, adaptations, and variations may be made therein and elsewhere in the described embodiments without departing from the scope of the invention as defined by the claims.

What is claimed is:

1. An interface circuit for connection to a non-dedicated telephone line, said circuit comprising:
   switching means having a first state and a second state;
   means for presenting a high impedance to the telephone line in the first state of the switching means, whereby normal use of the telephone line is undisturbed;
   means for coupling signals from a transmit path to the telephone line and from the telephone line to a receive path in the second state of the switching means; and
   means for counteracting the effect of said high impedance on signals received via the telephone line in the first state of the switching means, whereby said signals are coupled to the receive path.

2. An interface circuit as claimed in claim 1 wherein the means for coupling signals comprises a transformer and the means for presenting a high impedance comprises a high impedance via which a winding of the transformer is coupled to the telephone line in the first state of the switching means, the high impedance being by-passed in the second state of the switching means.

3. An interface circuit as claimed in claim 1 wherein the means for counteracting the effect of said high impedance comprises a tuned circuit for counteracting the effect of said high impedance on signals received via the telephone line in the first state of the switching means and having frequencies at about the resonance frequency of the tuned circuit.

4. An interface circuit as claimed in claim 2 wherein the means for counteracting the effect of said high impedance comprises a tuned circuit, comprising a capacitor and a winding of the transformer, for counteracting the effect of said high impedance on signals received via the telephone line in the first state of the switching means and having frequencies at about the resonance frequency of the tuned circuit.

5. An interface circuit as claimed in claim 1, 3, or 4 wherein the means for coupling signals from the telephone line to the receive path comprises an amplifier, and the means for counteracting the effect of said high impedance comprises means for increasing the gain of the amplifier in the first state of the switching means.

6. An interface circuit as claimed in claim 2 wherein the means for coupling signals from the telephone line to the receive path comprises an amplifier and the means for counteracting the effect of said high impedance comprises means for increasing the gain of the amplifier in the first state of the switching means.

7. Apparatus for receiving and transmitting signals via a non-dedicated telephone line, said apparatus comprising an interface circuit as claimed in claim 1, 4, or 6 and means responsive to signals supplied via the telephone line to the receive path for controlling the switching means.

8. An interface circuit for coupling a receive path and a transmit path to a non-dedicated telephone line, said circuit comprising:

a transformer having first and second windings;

first impedance means for coupling the first winding of the transformer to the telephone line with a sufficiently high impedance that normal use of the telephone line is undisturbed;

second impedance means coupled between the transmit path and the second winding of the transformer;

amplifier means coupled between the second winding of the transformer and the receive path; and switching means selectively operable to decrease the impedances of the first and second impedance means and to decrease the gain of the amplifier means.

9. An interface circuit for coupling a receive path and a transmit path to a non-dedicated telephone line, said circuit comprising:

a transformer having first and second windings;

first impedance means for coupling the first winding of the transformer to the telephone line with a sufficiently high impedance that normal use of the telephone line is undisturbed;

second impedance means coupled between the transmit path and the second winding of the transformer;

differential amplifier means having differential inputs coupled to the second winding of the transformer and to the transmit path and having an output coupled to the receive path; and switching means selectively operable to decrease the impedances of the first and second impedance means and to decrease the gain of the differential amplifier means.

10. An interface circuit for coupling a receive path and a transmit path to a non-dedicated telephone line, said circuit comprising:

a transformer having first and second windings;

first impedance means for coupling the first winding of the transformer to the telephone line with a sufficiently high impedance that normal use of the telephone line is undisturbed;

second impedance means coupled between the transmit path and the second winding of the transformer;

coupling means coupling the second winding of the transformer to the receive path;

a capacitor connected to the second winding of the transformer and forming a tuned circuit therewith, whereby signals having frequencies at about the resonance frequency of the tuned circuit and coupled to the first winding of the transformer via the first impedance means are coupled via the coupling means to the receive path; and switching means selectively operable to decrease the impedances of the first and second impedance means.

11. An interface circuit as claimed in claim 10 wherein the coupling means comprises a differential amplifier having a non-inverting input coupled to the second winding of the transformer, an inverting input coupled to the transmit path, and an output coupled to the receive path.

12. An interface circuit as claimed in claim 8, 9, or 10 wherein said switching means is selectively operable to decrease the impedance of the first impedance means to substantially zero and to decrease the impedance of the second impedance means to substantially match the characteristic impedance of the telephone line.

13. Apparatus for receiving and transmitting signals via a non-dedicated telephone line, said apparatus comprising an interface circuit as claimed in claim 8, 9, or 10 and means responsive to signals supplied via the telephone line to the receive path for controlling the switching means.

14. Apparatus for connection to a non-dedicated telephone line, said apparatus comprising an interface circuit as claimed in claim 1, 3, or 4 and signalling means connected to the receive and transmit paths of the interface circuit, the signalling means being responsive to a predetermined combination of signals supplied to the receive path via the telephone line and the interface circuit with the switching means of the interface circuit in said first state to cause the switching means to adopt said second state.

* * * * *